(12) United States Patent
Jajtic et al.

(10) Patent No.: US 11,898,917 B2
(45) Date of Patent: Feb. 13, 2024

(54) METHOD FOR MONITORING A COIL TEMPERATURE

(71) Applicant: Siemens Aktiengesellschaft, Munich (DE)

(72) Inventors: Zeljko Jajtic, Munich (DE); Peter Sachsenhauser, Au (DE); Jürgen Böhling, Dachau (DE); Tobias Taubald, Munich (DE); Christian Volmert, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/023,615

(22) PCT Filed: Aug. 4, 2021

(86) PCT No.: PCT/EP2021/071765
§ 371 (c)(1),
(2) Date: Feb. 27, 2023

(87) PCT Pub. No.: WO2022/043013
PCT Pub. Date: Mar. 3, 2022

(65) Prior Publication Data
US 2023/0243708 A1 Aug. 3, 2023

(30) Foreign Application Priority Data
Aug. 31, 2020 (EP) .................................. 20193637

(51) Int. Cl.
*G01K 7/00* (2006.01)
*G01K 7/16* (2006.01)
(Continued)

(52) U.S. Cl.
CPC ............... *G01K 7/16* (2013.01); *G01K 1/024* (2013.01); *G01K 3/005* (2013.01); *H02H 6/00* (2013.01);
(Continued)

(58) Field of Classification Search
CPC . G01K 7/16; G01K 1/24; H02P 29/64; H02H 6/00
(Continued)

(56) References Cited

U.S. PATENT DOCUMENTS 3,959,692 A * 5/1976 Wetzel ..................... H02H 5/04
361/103
4,377,739 A * 3/1983 Eckert, Jr. .......... G03G 15/2003
219/505
(Continued)

FOREIGN PATENT DOCUMENTS

AU 2003245234 A1 * 2/2004
CN 85 102 463 A 2/1987
(Continued)

OTHER PUBLICATIONS

18023615_2023-09-28_DE_102021207107_A1_I.pdf,Jan. 2023.*
(Continued)

*Primary Examiner* — Gail Kaplan Verbitsky
(74) *Attorney, Agent, or Firm* — Henry M. Feiereisen LLC

(57) ABSTRACT

In a method for monitoring a winding temperature of a winding of an electric machine powered by a converter, a heating power applied to the winding of the electric machine is determined and evaluated using a thermal model. A relative increase in a resistance of the winding, when the winding heats up, is determined from the heating power in comparison with a standard reference value for 20° C. winding temperature. The winding temperature is calculated
(Continued)

from the relative increase in the resistance, and a warning signal and/or a switch-off signal is generated when a critical winding temperature value is exceeded.

12 Claims, 5 Drawing Sheets

(51) Int. Cl.
    *H02P 29/64*     (2016.01)
    *G01K 1/024*     (2021.01)
    *G01K 3/00*     (2006.01)
    *H02H 6/00*     (2006.01)

(52) U.S. Cl.
    CPC .......... *H02P 29/64* (2016.02); *G01K 2217/00* (2013.01)

(58) Field of Classification Search
    USPC ........................................ 374/141, 152, 153
    See application file for complete search history.

(56) References Cited

U.S. PATENT DOCUMENTS

| | | | |
|---|---|---|---|
| 6,434,505 B1* | 8/2002 | Koepke | H02H 6/005 |
| | | | 374/E7.042 |
| 2004/0190207 A1* | 9/2004 | Hoppe | G01K 5/48 |
| | | | 374/E5.03 |
| 2007/0153433 A1 | 7/2007 | Sundquist | |
| 2020/0328648 A1* | 10/2020 | Kifer | B23K 26/32 |
| 2021/0184609 A1* | 6/2021 | Prescher | H02P 21/16 |

FOREIGN PATENT DOCUMENTS

| | | | | |
|---|---|---|---|---|
| CN | 85102463 A | * | 2/1987 | |
| CN | 19740971 A | * | 3/1998 | |
| CN | 102 566 434 A | | 7/2012 | |
| CN | 106233614 B | * | 2/2019 | ............. H02P 25/18 |
| CN | 110071682 A | * | 7/2019 | |
| CN | 209930178 U | * | 1/2020 | |
| CN | 213335744 U | * | 6/2021 | |
| DE | 10 2006 027 174 A1 | | 1/2007 | |
| DE | 10 2009 025 078 A1 | | 2/2010 | |
| DE | 102009025078 A1 | * | 2/2010 | ............. H02H 6/00 |
| DE | 102016224262 A1 | * | 6/2018 | |
| DE | 102021207107 A1 | * | 1/2023 | |
| JP | H0687641 B2 | * | 11/1994 | |
| JP | 2014032120 A | * | 2/2014 | |
| JP | 6637536 B2 | * | 1/2020 | |
| RU | 2182743 C1 | * | 5/2002 | |
| SU | 1190213 A | * | 11/1985 | |
| SU | 1467523 A1 | * | 3/1989 | |
| SU | 1467675 A1 | * | 3/1989 | |
| WO | WO2004012327 A | * | 2/2004 | |
| WO | WO-2015118678 A1 | * | 8/2015 | ............. H02P 29/60 |
| WO | WO-2015199176 A1 | * | 12/2015 | |

OTHER PUBLICATIONS

18023615_2023-09-28_WO_2015118678_A1_H.pdf,Aug. 2015.*
PCT International Search Report and Written Opinion of International Searching Authority dated Nov. 18, 2021 corresponding to PCT International Application No. PCT/EP2021/071765 filed Aug. 4, 2021.

* cited by examiner

METHOD FOR MONITORING A COIL TEMPERATURE

CROSS-REFERENCES TO RELATED APPLICATIONS

This application is the U.S. National Stage of International Application No. PCT/EP2021/071765 filed Aug. 4, 2021, which designated the United States and has been published as International Publication No. WO 2022/043013 A1 and which claims the priority of European Patent Application, Serial No. 20193637.4, filed Aug. 31, 2020, pursuant to 35 U.S.C, 119(a) (d).

BACKGROUND OF THE INVENTION

The invention relates to a method for monitoring a winding temperature of a winding of an electric machine.

For highly dynamic accelerations, dynamoelectric machines are required whose thermal protection, in particular thermal motor protection, is suitable for a temperature increase of at least 20 K/s to 30 K/s. To protect the winding from overheating, thermal sensors, for example, PTC sensors, are usually installed in the machine trains.

However, these PTC sensors are not suitable for higher rates of temperature increase. Among other things, due to its own thermal inertia, a switch-off signal is delayed, which results in overheating of the machine. This can lead to damage to the winding and to failure of the machine.

The object of the invention is to improve a dynamoelectric machine.

SUMMARY OF THE INVENTION

The object is achieved by a method for monitoring a winding temperature of a winding of an electric machine, wherein the electric machine is powered by a converter, wherein a heating power applied to the winding is determined,
wherein the heating power is evaluated using a thermal model,
wherein a warning signal and/or a switch-off signal is generated when a critical
winding temperature value linked to the heating power is exceeded.

The invention is particularly suitable for dynamoelectric machines. However, the invention can also be used for transformers.

The thermal model is preferably an $I^2t$ model.

The thermal model is preferably a thermal machine model.

The winding temperature value is preferably determined from the heating power.

The machine preferably operates during motor operation.

When the switch-off signal occurs, the electric machine is preferably to be switched off or is switched off immediately or at least in a timely manner.

A warning signal can be triggered at a lower temperature threshold, in particular before the switch-off signal. This offers the possibility for a machining cycle, for example in a machine tool, to be terminated in a defined manner before switching off.

The method is advantageously based on a determination of a relative increase in a resistance of the winding, in particular of the copper winding (or individual UVW motor strands), when this winding heats up (cf. basic laws of physics of the temperature dependence of the electrical resistance) in comparison with a standard reference value for 20° C. winding temperature, in particular copper temperature (also referred to as "cold winding").

The winding temperature can be calculated from this relative increase in the electrical resistance with the aid of the basic laws of physics.

In the method, not the electrical resistance, but the heating power, is determined directly (linearly proportional to the resistance acc. Pcu=$I^2R$). A measurement of the resistance usually requires a separate measurement sequence with DC currents, which is susceptible to interference and requires an interruption during ongoing operation.

The instantaneous heating power of the winding is not susceptible to interference and can advantageously be determined during ongoing operation with normal operating currents, in particular with the variables required for this (for example, current commutation angle, output power of the converter, mech. output power of the motor, etc.), which are advantageously all present in a converter (and advantageously are known at any time).

In an advantageous embodiment, the heating power applied to the winding is determined on the converter side.

On the converter side means advantageously: Within the control of the converter.

Advantageously, all required variables are present or known there.

In an advantageous embodiment, the heating power applied to the winding is measured during a time interval and an average heating power is determined therefrom.

This is advantageously achieved at least substantially in real time.

In an advantageous embodiment, the heating power applied to the winding is determined during ongoing converter operation.

The invention offers the advantage of sensorless monitoring or measurement of the winding temperature during ongoing converter operation of an electric machine, in particular of a synchronous motor excited by a permanent magnet, as a result of which overheating, and failure of the machine are prevented.

Monitoring of the average winding temperature is advantageously based on a converter-side measurement of the heating power applied to the winding, which is evaluated in a thermal model, in particular an $I^2t$ model.

In the thermal model, the winding temperature is advantageously determined from measured physical values.

If the critical winding temperature value associated with the heating power is exceeded, a warning signal and/or a switch-off signal is generated.

For example, for a design according to insulation of heat class F, the maximum permissible winding temperature is 140° C. (average value within the winding) or 155° C. (peak value within the winding).

Advantageously, the applied average heating power is determined in a time interval Δt at a winding temperature in the converter to be determined (that is to say, hitherto unknown). The following applies:

$$P_{Cu,x} = U_x \cdot I_x - P_{mech,x}$$

For $n_x=0$ the following applies: $P_{Cu,x}=U_x \cdot I_x$

The following also applies: $P_{mech,0} \approx k_T(I_x) \cdot I_{qx} \cdot n_x \cdot 2\pi/60$ $P_{Cu,x}$ here is the average heating power at an unknown temperature x.

$U_x$ and $I_x$ are a motor voltage and a motor current.

$P_{mech,x}$ is the mechanical power.

$n_x$ is the rotational speed.

$k_T(I_x)$ is a current-dependent torque constant of the motor.

$I_{qx}$ is a torque-forming current component.

In an advantageous embodiment, the average heating power is compared with a defined and/or previously determined heating power, in particular at a known winding temperature.

The average heating power is advantageously measured.

The known winding temperature is advantageously determined by a reference measurement.

A winding temperature is particularly suitable as a reference measurement for $T_{Cu}=20°$ C.

The following applies: $P_{Cu,20°\,C.}=U_0 \cdot I_0 - P_{mech,0}$

Preferably n=0 applies, and thus $P_{Cu,20°\,C.}=U_0 \cdot I_0$

In an advantageous embodiment, a change in a winding resistance is determined by means of a relative change in the determined heating power.

In this case, relative preferably means: relative to the heating power of the cold winding, advantageously at a reference temperature of the winding, in particular copper winding, $T\_cu=20°$ C.

Advantageously, a change in a winding resistance is determined by a relative change in the determined heating power for the reference measurement.

Including a scaling with currents, if $I_x \neq I_0$, the following applies:

$$P_{Cu,x}=I_x^2 \cdot R_x$$

$$P_{Cu,20°\,C.}=I_0^2 \cdot R_{20°\,C.}$$

The following applies to the winding resistance:

$$R_x = R_{20°\,C.} \cdot (P_{Cu,x}/P_{Cu,20°\,C.}) \cdot (I_0/I_x)^2$$

In addition, a resistance of the supply lines or the heating power occurring there is advantageously taken into account in the determination of the motor heating power.

In an advantageous embodiment, each machine train is monitored individually.

In an advantageous embodiment, a phase heating power is determined on the basis of a commutation angle.

In addition, the determined heating power can be included in the determination.

This is advantageously achieved in that for at least one, preferably each, commutation angle, an exact distribution of the total measured heating power to the three motor strands is calculated and thus each strand can be separately monitored thermally (for example, at a standstill).

The formulae described comprise effective values, in particular $P_{Cu,x}$, $U_x$, $I_x$, which corresponds, for example, to the DC measured values when at a standstill or, in the case of the rotating field, relates to a period (effective value of sinusoidal variables).

In general, $P_{Cu,x}$, which is measured at any time interval $\Delta t = t2-t1$, preferably applies to the average heating power:

$$P_{Cu,x,ave}=(1/\Delta t)\cdot\int_{\Delta t}\{[u_x(t)\cdot i_x(t)]dt - p_{mech,x}(t)dt\}$$

The invention enables sensorless monitoring of the average winding temperature during ongoing converter operation. Monitoring is possible individually for each strand.

In the case of multi-strand machines, in particular 3-strand machines, the winding (for example, UVW motor strands) is advantageously energized with multi-phase (here with 3-phase) sinusoidal currents, with a corresponding phase offset (120° el. for m=3) between the individual phases, i.e. in the course of time (with a rotating motor), all three strand currents are preferably sinusoidal, but because of their phase shift, instantaneous values of the currents in individual motor strands are different, according to the commutation angle of the 3-phase sinusoidal system.

If, for example, the machine is in the "At standstill with load" operating state (rotational speed n=0) and a torque nevertheless has to be supplied (for example, in the case of a so-called suspended load), the instantaneous currents of the 3 UVW motor strands are not equal to one another and as a result, the heating power ($I^2R$), and thus the thermal load of individual strands, is different.

Thus, for example, in the case of a current in a strand (for example, strand U), the amplitude value of the sinusoidal course $I_{max}=\sqrt{(2)}*I_{eff}$ can be set in accordance with the current commutation angle, the current in the two other motor strands (V and W) corresponding to the 3-phase power system having only half the amplitude value $I_{max}/2$, specifically over the entire operating state.

Therefore, the three strands, for this and advantageously for any other commutation angle, heat up to different extents during the energized standstill of the machine. The thermal motor protection advantageously refers to the most thermally loaded strand, i.e. to the strand with the highest standstill current of all three UVW strands, corresponding to the current commutation angle known to the converter.

The invention offers the advantage that no thermal ESB model is required as a simulation of the thermal network of the motor. Advantageously, the winding temperature is determined directly at any instant, i.e. the temperature of the monitored object is determined directly, without simulating the thermal interaction and the heat flows with the environment and regardless of the cause or source of the winding heating.

The method can also be used if the winding has become warm or hot due to external sources.

The invention is also advantageous as a temperature sensor is not required.

The invention is also advantageous as a thermal equivalent circuit diagram of the machine is not required.

The invention is farther achieved by an apparatus for carrying out such a method.

The invention is further achieved a drive, comprising a dynamoelectric machine, a converter and an apparatus.

Monitoring is achieved in a sensorless manner. This reduces the installation effort of components and costs therefor.

Furthermore, there is a cost and reliability advantage for customers as the error-prone sensors, lines and other connection technology are not required.

The invention is particularly suitable for permanently excited synchronous machines, for example, with water cooling. These include, inter alia, linear and torque motors. They are used as built-in motors, for example, for highly dynamic accelerations in direct drives for machine tools.

The invention is advantageous as very high accelerations are made possible. Inter alia, this is associated with very high maximum currents or a high $I_{max}$ increase. In this case, the invention enables good handling of a temperature increase from, for example, 45 K/s to 70 K/s.

The invention offers the advantage that energy efficient as well as improved thermal motor utilization, which can be optimized for all operating states, is present.

Furthermore, there are no problems with regard to reliable electrical separation as no sensors need to be installed close to the winding. In addition, no allowance needs to be made for safety margins.

BRIEF DESCRIPTION OF THE DRAWING

The invention is described and explained in more detail hereinafter with reference to the exemplary embodiments shown in the figures, in which.

DETAILED DESCRIPTION OF PREFERRED EMBODIMENTS

Figure 1:
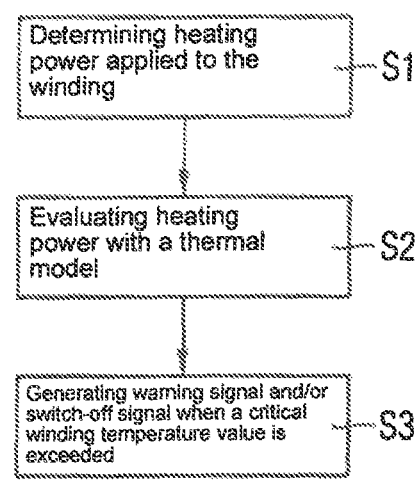
FIG. 1 shows a possible sequence of the method according to the invention.

The method for monitoring a winding temperature of a winding of an electric machine, the electric machine being fed by a converter, comprises the following method steps:

In a method step S1, a heating power applied to the winding is determined.

In a method step S2, the heating power is evaluated by means of a thermal model.

In a method step S3, a warning signal and/or a switch-off signal is generated when a critical winding temperature value associated with the heating power is exceeded.

As already explained, the heating power of the winding is determined. Advantageously, this is achieved in that the heating power is calculated from currents or voltages measured in the converter.

Two exemplary cases are:

If the complete output power of the converter is preferably used entirely for heating the ohmic winding resistance (at a standstill, n=0, the mechanical output power of the motor is Pmech=0; the current motor rotational speed is advantageously known to the converter continuously, i.e. preferably at any instant), the heating power is determined by the converter or within the converter by means of measurement of Ux and Ix in the 3-phase system.

In this case, it is possible to speak of a measured heating power.

If the motor supplies a mechanical output power for the time interval under consideration (Pmech≠0 because n≠0), the heating power of the winding is advantageously determined or calculated from the supplied output power of the converter by subtracting the mechanical power (Pmech) supplied by the motor.

The heating power of the winding is preferably calculated according to the formula: P_cu=P_output−P_mech, for which purpose the converter advantageously has all the required variables, namely P_mech=M_motor*n and the motor torque M_motor=Iq*k_T.

In this case, Iq denotes the torque-forming current which is generated and applied to the motor by the converter (i.e., in this case, in addition to the rotational speed n, the current $I_q$ is also a variable known to the converter), k_T is the torque constant of the motor, which is preferably read in for each motor with its so-called converter parameter list.

With reference to the formulae mentioned, the heating power P_cable, which is produced on the lines between the converter and the motor, can be drawn off in order to obtain the pure heating power in the motor winding. For this purpose, corresponding data are advantageously known via lines which can be read into the converter as parameters for the drive configuration (see also reference characters 101 in FIG. 2).

In most cases, a proportion of the cable heating power is much smaller in comparison to the heating power in the winding and if line data is not known, this proportion can be disregarded. Nevertheless, the proposed method can be used only with reduced accuracy.

Figure 2:
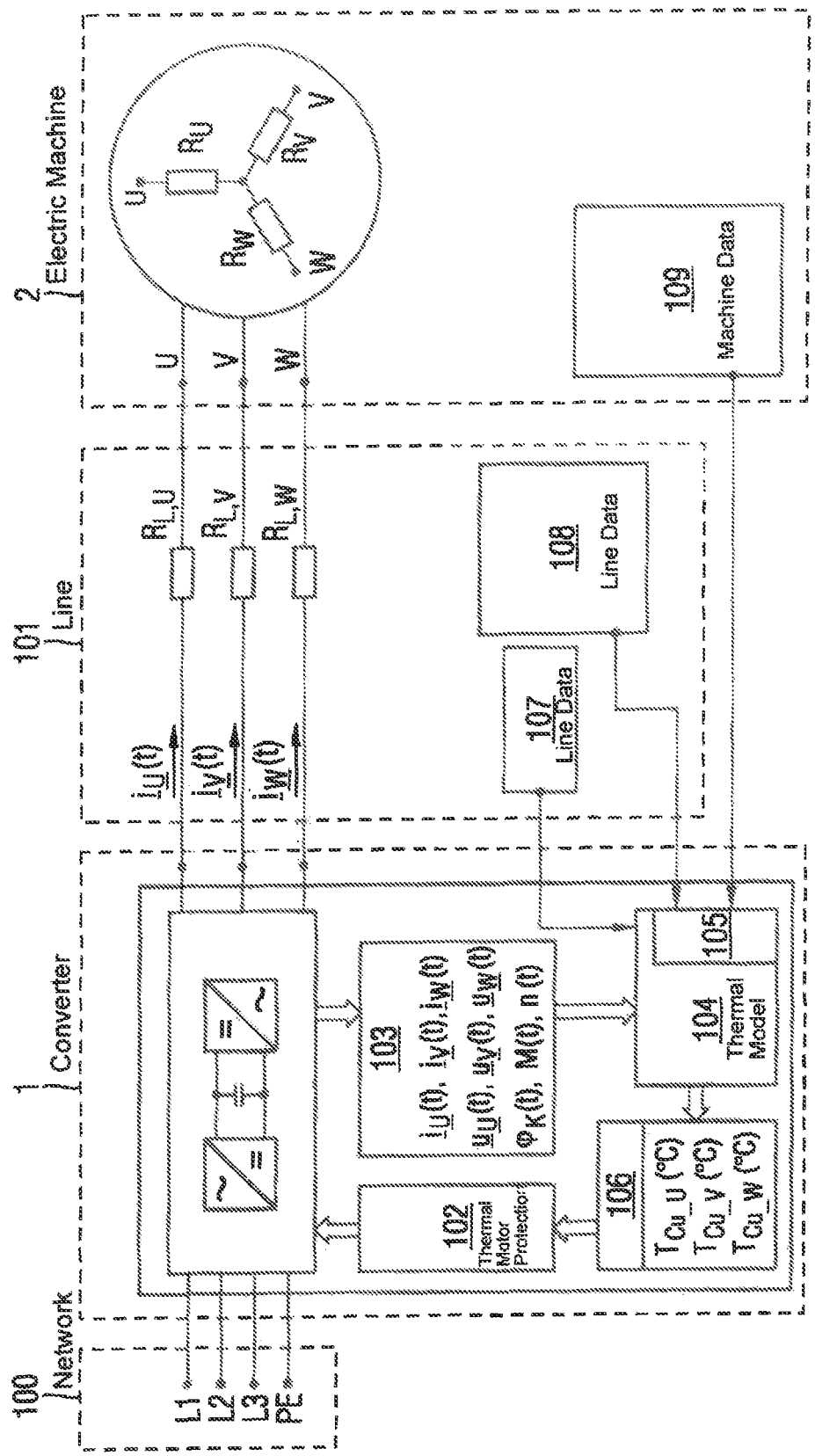
FIG. 2 shows a drive.

FIG. 2 shows a drive 4. The drive 4 has an electric machine 2 and a converter 1. The converter comprises an apparatus for carrying out the method described above.

The apparatus can have hardware, for example measurement technology for detecting operating variables. The apparatus can also have a calculation model.

The converter 1 is connected to a network 100, comprising L1, L2, L3 and PE.

A detection of operating variables, in particular operating variables at the current time such as currents, voltages, torque and rotational speed, is represented by a block 103. The operating variables are processed in a thermal model 104. A block 105 is used for an initialization procedure in which a reference measurement is advantageously carried out.

A determination of the winding temperature, in particular strand-related, takes place in a block 106.

A thermal motor protection 102 preferably generates the warning or switch-off signal.

Converter 1 and machine 2 are connected via a line 101. The figure shows the currents $i_U$ (t), $i_V$ (t) and $i_W$ (t). Advantageously, these are operating currents during ongoing operation. Furthermore, the figure shows the line resistances $R_{L,U}$, $R_{L,V}$ and $R_{L,W}$.

In addition, line data are taken into account in the model 104. This is represented by block 107 and by block 108.

Block 107 advantageously provides information about an ambient temperature $T_0$.

Block 108 advantageously provides information, in particular at ambient temperature, about line data such as the line resistance, a line cross-section and a line length.

In the figure, the machine 2 comprises three strands U, V and W.

Machine data is also taken into account in model 104. This is represented by block 109.

Block 109 advantageously provides information about winding resistances $R_U$, $R_V$ and $R_W$, winding cross-sections, weight and currents.

Figure 3:
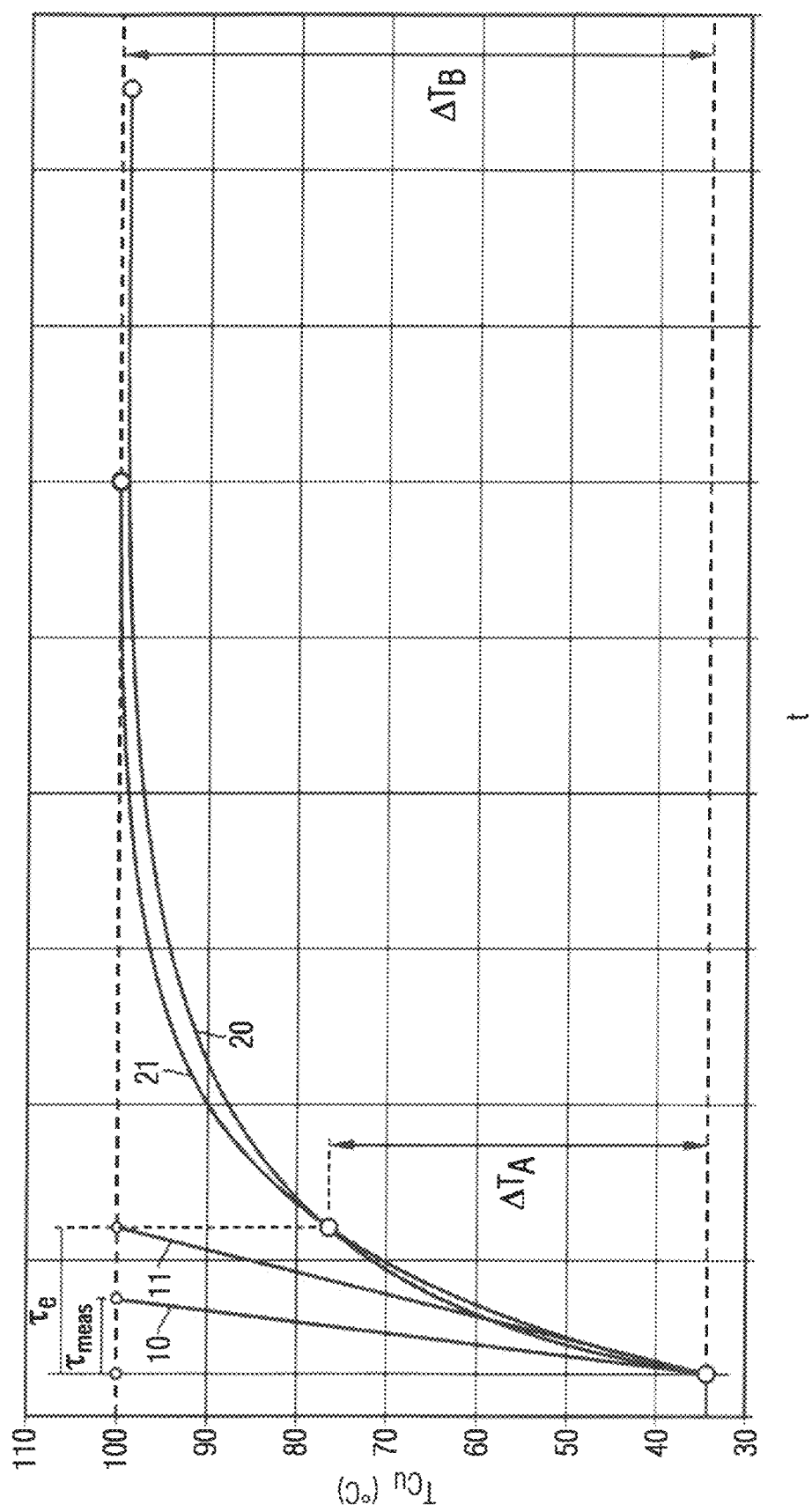
FIG. 3 shows a comparison of two courses of the winding temperature.

FIG. 3 shows a comparison between a course 20 of the winding temperature determined by means of the method with a course 21 determined by means of an e-function.

The course 21 shows a simulation of the winding temperature $T_{Cu}(t)$ over time t within only one time constant t of the e-function. This represents a thermal motor model with only one thermal capacity, a so-called one-mass model. The course 21 shows a marked deviation from the determined real-time course 20 during a heating process.

The figure also shows a tangent 10 for $\tau_{meas}$ and a tangent 11 for $\tau_e$. The tangents show the marked deviation between the initial gradients of the two courses.

Thus, it is clear that in the case of methods resulting in the course 21, large safety margins are required, leading to poor motor utilization.

The method according to the invention, which is based on a real-time measurement of the winding temperature by means of a measurement of the heating power, preferably during ongoing converter operation, enables very good motor utilization.

Figure 4:
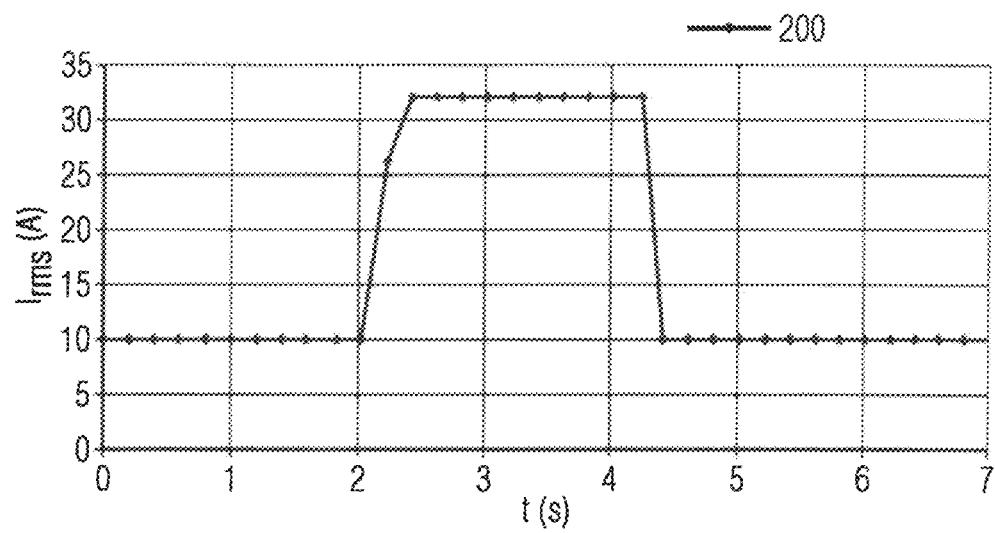
FIG. 4 FIG. 5 and FIG. 6 show courses from an exemplary load cycle.
Figure 5:
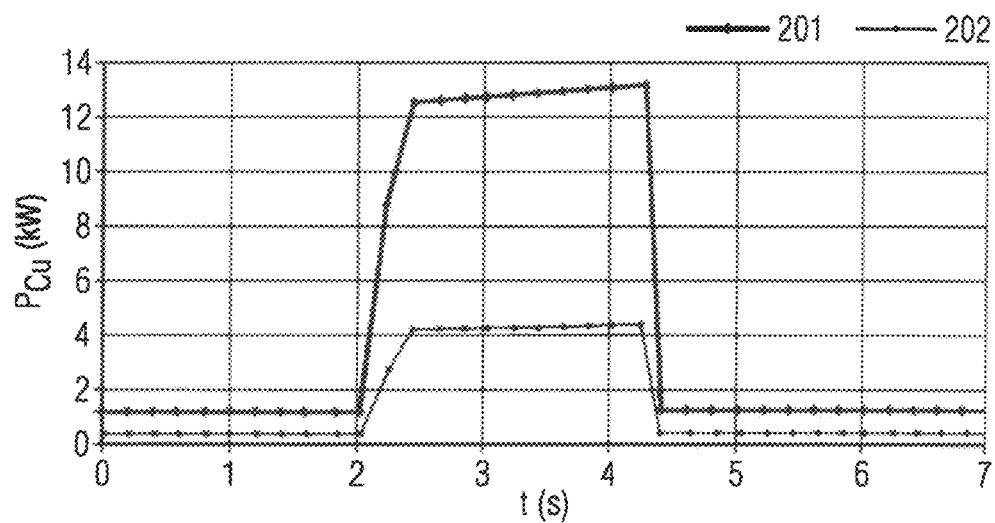
Figure 6:
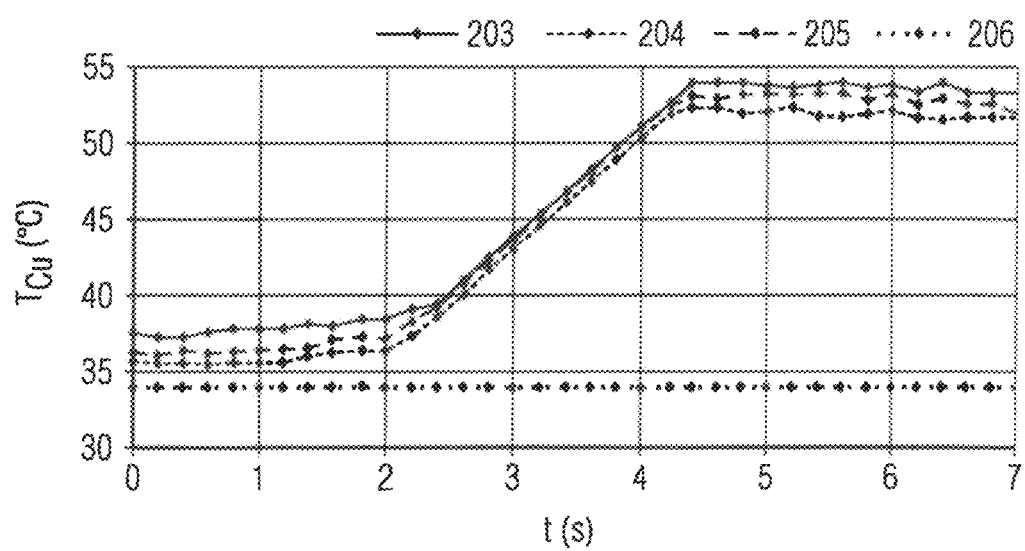

In FIG. 4, FIG. 5 and FIG. 6, courses from an exemplary load cycle of the motor operation are shown. The figures show a current course, measured heating power (for three strands and a sum value) and the resulting course of the winding temperature (for three strands).

FIG. 4 shows an exemplary course 200 of a current $I_{ms}$ of the strands U, V, W as a function of time t. FIG. 5 shows an exemplary course 202 of the heating power $P_{Cu}$ of the strands U, V, W as a function of time t. FIG. 5 also shows a course 201 of a total heating power $P_{Cu}$. FIG. 6 shows exemplary courses 203 (strand U), 204 (strand V) and 205 (strand W) of the winding temperature $T_{Cu}$ as a function of time t. In addition, a course of a cooling water temperature 206 is shown.

The invention claimed is:

1. A method for monitoring a winding temperature of a multiphase winding of an electric machine powered by a multiphase AC/AC converter, said method comprising:
   determining electrical power applied from an output of the multiphase AC/AC converter to the multiphase winding of the electric machine;
   determining a heating power dissipated by the multiphase winding from a product of output voltages and output currents measured for each phase at the multiphase AC/AC converter after subtracting from the electrical power a mechanical power generated by the electric machine;
   determining a relative increase in a resistance of the multiphase winding caused by the dissipated heating power, when the winding heats up, in comparison with a reference resistance value at a reference winding temperature;
   calculating the winding temperature from the relative increase in the resistance of the multiphase winding, using a known temperature dependence of the resistance of the multi hale winding; and
   generating a warning signal and/or a switch-off signal when a critical winding temperature value is exceeded.

2. The method of claim 1, wherein the relative increase in the resistance of the winding is determined for an entire multiphase winding or for individual strands of the multiphase winding.

3. The method of claim 1, wherein the winding is constructed of copper and the winding temperature is a copper temperature.

4. The method of claim 1, further comprising:
   measuring the heating power applied to the winding for a period of time; and
   determining an average heating power by integrating the measured heating power dissipated by the multiphase winding minus the mechanical power generated by the electric machine over the period of time.

5. The method of claim 1, wherein the heating power dissipated by the winding is determined while the multiphase AC/AC converter provides electrical power to the multiphase winding of the electric machine.

6. The method of claim 4, further comprising comparing the average heating power with a defined or previously determined heating power.

7. The method of claim 6, wherein the previously determined heating power is determined at the reference winding temperature.

8. The method of claim 7, wherein the reference winding temperature is 20° C.

9. The method of claim 2, further comprising monitoring each of the strands individually.

10. The method of claim 2, further comprising determining the heating power of each of the individual strands of the multiphase winding based on a commutation angle of the electric machine.

11. Apparatus for monitoring a winding temperature of a multiphase winding of an electric machine powered by a multi phase AC/AC converter, said apparatus configured to:
    determine electrical power applied from an output of the multiphase AC/AC converter to the multiphase winding of the electric machine,
    determine a heating power dissipated by the multiphase winding from a product of output voltages and output currents measured for each phase the multiphase AC/AC converter after subtracting from the electrical power a mechanical power generated by the electric machine;
    determine a relative increase in a resistance of the multiphase winding caused by the dissipated heating power, when the winding heats up, in comparison with a reference resistance value at a reference winding temperature;
    calculate the winding temperature from the relative increase in the resistance of the multiphase winding, using a known temperature dependence of the resistance of the multiphase winding; and
    generate a warning signal and/or a switch-off signal when a critical winding temperature value is exceeded.

12. A drive, comprising:
    a dynamoelectric machine including a multiphase winding;
    a multiphase AC/AC converter powering the dynamoelectric machine; and
    an apparatus for monitoring a winding temperature of the multiphase winding of the dynamoelectric machine, said apparatus configured to:
    determine electrical power applied from an output of the multiphase AC/AC converter to the multiphase winding of the electric machine,
    determine a heating power dissipated by the multiphase winding from a product of output voltages and output currents measured for each phase at the multiphase AC/AC converter after subtracting from the electrical power a mechanical power generated by the electric machine;
    determine a relative increase in a resistance of the multiphase winding caused by the dissipated heating power, when the winding heats up, in comparison with a reference resistance value at a reference winding temperature;
    calculate the winding temperature from the relative increase in the resistance of the multiphase winding, using a known temperature dependence of the resistance of the multiphase winding; and
    generate a warning signal and/or a switch-off signal when a critical winding temperature value is exceeded.

* * * * *

UNITED STATES PATENT AND TRADEMARK OFFICE
CERTIFICATE OF CORRECTION

| | |
|---|---|
| PATENT NO. | : 11,898,917 B2 |
| APPLICATION NO. | : 18/023615 |
| DATED | : February 13, 2024 |
| INVENTOR(S) | : Zeljko Jajtic et al. |

It is certified that error appears in the above-identified patent and that said Letters Patent is hereby corrected as shown below:

In the Claims

In Column 7, Claim 1, Line 3: replace "multi hale" with --multiphase--.

Signed and Sealed this
Twentieth Day of August, 2024

Katherine Kelly Vidal
*Director of the United States Patent and Trademark Office*